(12) United States Patent
Puthukattukaran et al.

(10) Patent No.: US 7,904,906 B2
(45) Date of Patent: Mar. 8, 2011

(54) TRACKING MODIFIED PAGES ON A COMPUTER SYSTEM

(75) Inventors: James J. Puthukattukaran, Marlborough, MA (US); Derek F. Shute, Worcester, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 1810 days.

(21) Appl. No.: 10/997,409

(22) Filed: Nov. 23, 2004

(65) Prior Publication Data

US 2006/0117300 A1    Jun. 1, 2006

(51) Int. Cl.
G06F 9/46  (2006.01)
G06F 13/00  (2006.01)
G06F 11/00  (2006.01)

(52) U.S. Cl. .................. 718/102; 714/100; 711/162
(58) Field of Classification Search ............... None
See application file for complete search history.

(56) References Cited

U.S. PATENT DOCUMENTS

| | | |
|---|---|---|
| 3,469,241 A | 9/1969 | Barton et al. |
| 4,825,354 A | 4/1989 | Agrawal et al. |
| 4,887,235 A | 12/1989 | Holloway et al. |
| 5,151,989 A | 9/1992 | Johnson et al. |
| 5,218,696 A | 6/1993 | Baird et al. |
| 5,237,673 A | 8/1993 | Orbits et al. |
| 5,313,647 A | 5/1994 | Kaufman et al. |
| 5,371,885 A | 12/1994 | Letwin |
| 5,551,020 A | 8/1996 | Flax et al. |
| 5,566,328 A | 10/1996 | Eastep |
| 5,608,901 A | 3/1997 | Letwin |
| 5,613,105 A | 3/1997 | Zbikowski et al. |
| 5,617,568 A | 4/1997 | Ault et al. |
| 5,628,007 A | 5/1997 | Nevarez |
| 5,664,172 A | 9/1997 | Antoshenkov |
| 5,664,178 A | 9/1997 | Sinofsky |
| 5,761,529 A | 6/1998 | Raji et al. |
| 5,960,446 A | 9/1999 | Schmuck et al. |
| 5,968,134 A | 10/1999 | Putzolu et al. |
| 6,023,706 A | 2/2000 | Schmuck et al. |
| 6,055,527 A | 4/2000 | Badger et al. |
| 6,055,617 A | 4/2000 | Kingsbury |
| 6,067,608 A | 5/2000 | Perry |
| 6,098,074 A | 8/2000 | Cannon et al. |
| 6,098,137 A | 8/2000 | Goodrum et al. |
| 6,119,214 A | 9/2000 | Dirks |
| 6,128,713 A | 10/2000 | Eisler et al. |
| 6,289,424 B1 | 9/2001 | Stevens |
| 6,336,177 B1 | 1/2002 | Stevens |
| 6,618,851 B1 * | 9/2003 | Zundel et al. ............... 717/103 |
| 6,631,480 B2 * | 10/2003 | Zeigler et al. ............... 714/20 |
| 6,714,904 B1 | 3/2004 | Torvalds et al. |

(Continued)

*Primary Examiner* — Meng-Ai An
*Assistant Examiner* — Mengyao Zhe
(74) *Attorney, Agent, or Firm* — K&L Gates LLP

(57) ABSTRACT

A method for tracking modified pages is provided. The method is utilized in a fault-tolerant system, the fault-tolerant system comprising a first computer system and a second computer system. The method involves copying a memory from the first computer system to the second computer system at a first point in time. Between the first point in time and a second point in time, a scheduler tracks processes that execute on the first computer system in a harvest list. After the second point in time, the processes that made changes to the memory between the first and second points in time are retrieved. The changes to the memory are then copied to the second computer system and the changes are applied to the memory of the second computer system.

26 Claims, 5 Drawing Sheets

U.S. PATENT DOCUMENTS 7,107,418 B2 * 9/2006 Ohran .......................... 711/161
2002/0116555 A1 8/2002 Somers et al.
2003/0159008 A1 8/2003 Sprangle et al.
2004/0019891 A1 * 1/2004 Koenen ........................ 718/102
2005/0234931 A1 * 10/2005 Yip et al. ..................... 707/100

* cited by examiner

TRACKING MODIFIED PAGES ON A COMPUTER SYSTEM

FIELD OF THE INVENTION

The present invention relates generally to computer systems and, more specifically, to achieving lockstep synchronicity between two or more computer systems.

BACKGROUND

Continuously available computer systems, i.e., fault-tolerant systems, typically have redundant hardware that execute in clock lockstep, i.e., the CPUs on both computer systems execute the same instructions in a given clock cycle. The failure of one of the computer systems does not typically bring the fault-tolerant system down and applications generally continue to execute on the redundant computer system without any interruption.

Lack of functional interruption is often critical in real-time redundant systems. Servers that run the New York Stock Exchange, computers that operate on the space shuttle, and chips that operate in some artificial hearts are examples of fault-tolerant systems. If a component does fail, a backup, generally an identically configured computer system or chip, exists to replace the failed component and pick up operations at the exact point of failure in terms of the functions being performed and the state of the system memory. One way to achieve this redundancy is to execute the components in lockstep synchronicity. In a fault-tolerant system, the two (or more) computer systems are typically physically identical e.g., both contain the same type of processor from the same manufacturer attached to identical motherboards. The computer systems share a common clock such that when an instruction is executed on one computer system, it is simultaneously executed on the other. Both write to the same address in memory in their respective data stores, and both take generally the same amount of time to complete a task. In the event that a computer system fails, the other takes over and is relied upon by the user.

When a failure does occur, the failed computer system is usually replaced as soon as possible because the system as a whole is no longer redundant and fault-tolerant. To facilitate the addition of a replacement computer system and to enable the replacement computer system to execute in lockstep with the executing (online) system, memory from the online computer system (the application and system state) generally needs to be copied to the newly added board. Traditional methods include halting all applications, copying the entire memory to the new computer system, and then resuming all processes in lockstep. However, halting the entire fault-tolerant system while the memory is copied may be inefficient and may not always be an option.

SUMMARY OF THE INVENTION

Though the present invention relates to computer systems in general, a preferred embodiment is described herein with respect to a fault-tolerant system comprising two computer systems.

Traditionally, installing a replacement component in a fault-tolerant system involved stopping the entire fault-tolerant system and copying the memory of the online, working computer system into the memory of the new, offline computer system. The time spent halting the system and copying the memory is known as a blackout period. Having a non-trivial blackout period can be unacceptable for applications with real-time performance constraints because the blackout effectively shuts the critical systems down. Therefore, there is still a need for a fault-tolerant system with minimal, if any, down time as the replacement components are brought online. Generally a computer system is termed online when it is executing user processes (irrespective of whether the computer system is operating in lockstep with another computer system). Correspondingly, a computer system is termed offline when it is not executing user processes. An offline computer may be powered off, or may be in a state, such as an intermediate boot up sequence, that the computer system is powered on, but is typically not executing user processes or generally not handling interrupts.

In brief overview, the present invention copies the memory from one computer system to another computer system. The present invention begins with one computer system online and one computer system offline. When the second computer system is in the process of starting up, the second computer system pauses until the memory from the first computer can be copied to the second computer system. This memory copy is done in an iterative manner to reduce the amount of memory copied with each subsequent copy cycle. Once the amount of memory to be copied over for an iteration falls below a specified threshold, both systems are halted and the small amount of memory representing the difference between the two system memories is copied over, and both systems are restarted, operating in lockstep.

The present invention provides means to bring an offline computer system online and achieve lockstep with another computer system in an efficient manner, with minimal time between being brought online and achieving synchronization. One way to minimize downtime is to allow one computer system to execute in a non-fault-tolerant state and to track the changes to memory (modified pages) made by the processes that have executed since the last data was copied to the offline system. The modified pages may then be copied to a location in memory on the second computer system that corresponds to their location in memory on the first computer system. As the modified pages are applied to the memory of the second computer system, the first computer system tracks the pages in memory that have been modified since the beginning of the last copy iteration. This second set of modified pages is then copied to the second computer system and applied to the memory of the second computer system. If necessary, the process then repeats.

Because the system as a whole is not brought down during the page tracking and copying, it is not fault-tolerant until lockstep is achieved. The time required to bring the replacement computer system close enough to achieving minimal blackout period is typically referred to as brownout. During brownout, computer system resources are diverted from their normal operation to the copying process. Thus, the computer system is often not executing at optimal efficiency. As time progresses, the number of modified pages that need to be copied from the first computer system to the second computer system generally converges towards a predetermined (e.g., trivial) amount. At that point, both computer systems may be taken offline and the modified pages can be applied to the second computer system. Once this happens, both computer systems may be brought back online and operate in lockstep. Because the number of modified pages to be copied converges to a predetermined, generally trivial amount, the time necessary for the computer systems to be taken offline is very small, typically between two hundred and three hundred milliseconds. After a brownout phase, the blackout period necessary to achieve lockstep is generally negligible.

In one aspect of the present invention, a method for tracking modified pages in a system is provided. The method relates to the interaction between a first computer system and a second computer system. A memory is copied from the first computer system to the second computer system at a first point in time. Between the first point in time and a second point in time, a scheduler tracks the processes that execute on the first computer system. After the second point in time, the processes that made changes to the memory between the first and second points in time are retrieved. The changes those processes made to their respective portions of memory are then sent to a communications port of the first computer system. The communications port then sends the changes to the second computer system via an intersystem communications means. A communications port on the second computer system receives the changes and copies them into memory. In some embodiments, the memory of the second computer system is directly accessible to the first computer system and the first computer system copies the changes directly into their corresponding memory addresses on the second computer system.

In one embodiment, the above steps are repeated until the first and second computer systems operate in lockstep. To facilitate the tracking process, the scheduler mentioned above may be any of a preemptive process scheduler, a non-preemptive process scheduler, and a task scheduler.

Several variations in the difference between the first and second points in time are contemplated. In some embodiments, the difference between the first point in time and the second point in time is a defined time interval. In some embodiments, the difference between the first point in time and the second point in time is a function of the size of the memory. In other embodiments, the difference between the first point in time and the second point in time is the time to complete the copying of the memory from the first computer system to the second computer system. Additionally, the difference between the first point in time and the second point in time may be a function of the throughput of the communications port. In one embodiment, the difference between the first point in time and the second point in time is an estimated time necessary for the communications port of the first computer system to send the modified pages to the second computer system. In at least one embodiment, the difference between the first point in time and the second point in time is the time required to copy the previous set of modified pages from the first computer system to the second computer system. In still another embodiment, the difference between the first point in time and the second point in time is the time it takes for a monitor process to obtain a lock on a harvest list and traverse it.

Another aspect of the claimed invention is an apparatus for tracking modified pages on a fault-tolerant system. The apparatus includes a scheduler configured to (i) begin tracking executing processes; (ii) allocate an execution time slice of a processor to a process; and (iii) store an identity of the process in a memory upon the process executing in accordance with the execution time slice allocated, wherein the memory is later traversed to determine which processes have modified pages.

Yet another aspect of the present invention is a system for tracking modified pages on a fault-tolerant system. The system includes a first and second computer system, each computer system comprising a memory, a communications port. The first computer system also includes a scheduler, a monitor process in communication with the scheduler, the memory, and the communications port. In this aspect, the monitor process is configured to copy, via the communications port and an intersystem communication means, at a first point in time, the memory from the first computer system to the second computer system. Additionally, the monitor process retrieves, from a harvest list provided by the scheduler, a process, or the identity of a process, that executes on the first computer system between the first point in time and the second point in time. In one embodiment, the identity of the process is stored in the process list as a process ID. The monitor process then retrieves from the process, after the second point in time, a change to the memory made by the process. Then the monitor process copies the change via the communications port of the first computer system to the communications port of the second computer system via the intersystem communication means, to ultimately be copied to the memory of the second computer system. Note that the harvest list provided by the scheduler comprises the processes that executed between the first point in time and the second point in time, including processes that are currently executing.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Figure 1A:
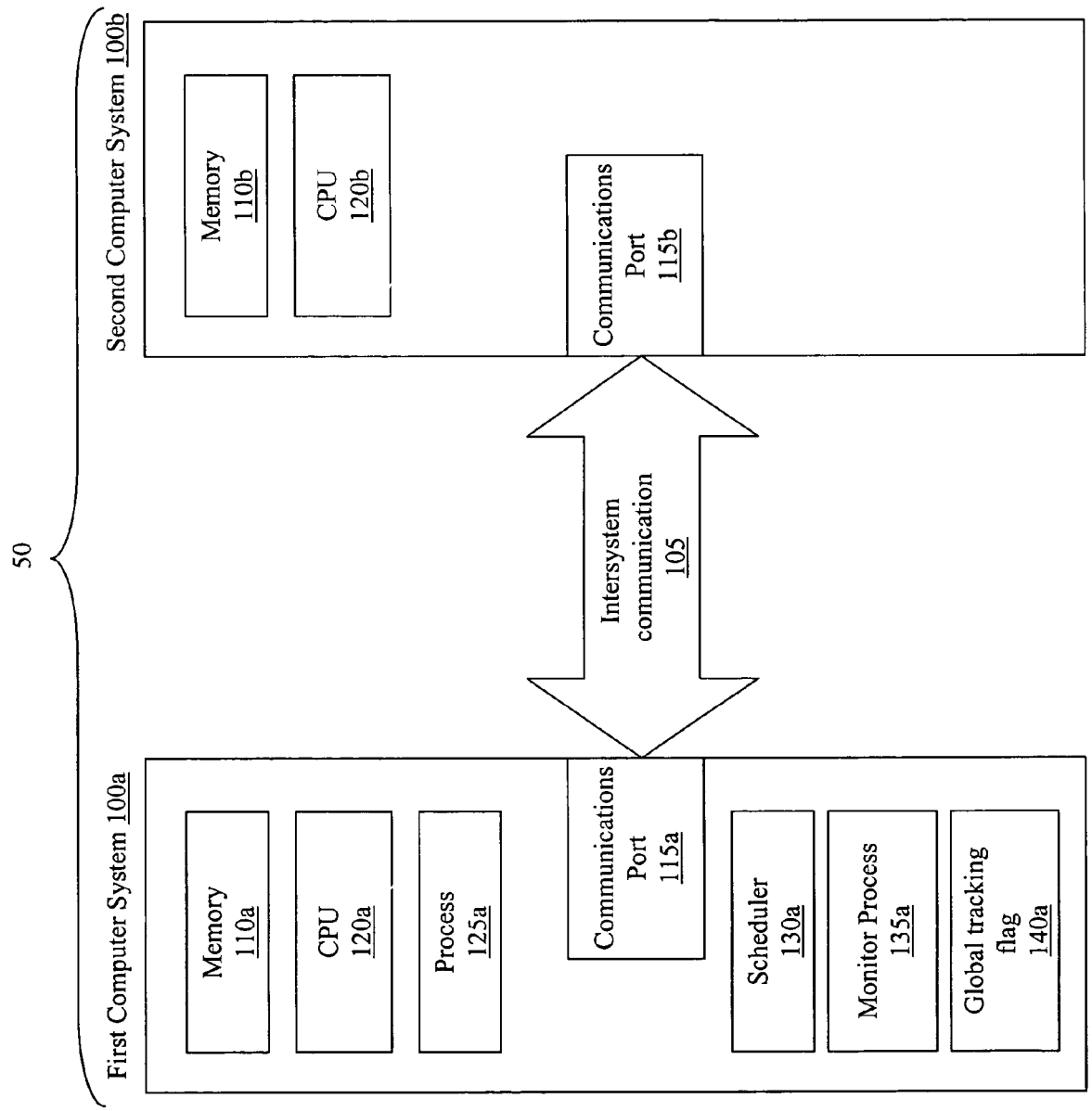
FIGS. 1A and 1B are block diagrams depicting an embodiment of a fault-tolerant system before and after achieving lockstep respectively.

Stopping two computer systems and waiting for the entire memory from the first computer system to be copied to the second computer system before achieving lockstep is neither desirable nor practical for systems that require constant availability. A more efficient method of bringing two computer systems into lockstep is to iteratively copy the memory of the first computer system to the second computer system while allowing the first computer system to service existing and new processes.

Sections of the memory that a process accesses are typically represented in each process's hardware page tables. Each entry, or page, represents a physical frame on the physical memory medium. As processes execute, they generally access and change memory allocated to them by the operating system. As a result, page table entries representing the portions of memory accessed and written to are also changed as the operating system interacts with the physical memory. As processes write to memory, the operating system sets the "dirty bit" of the corresponding page table entry. In particular, the operating system's memory management subsystem uses dirty bits to determine which entries have changed.

The present invention improves on these concepts and utilizes the dirty bits and page table entries to determine which portions of memory have changed since the last copying iteration between the two computer systems. At the beginning of the memory copy, a modified scheduler, which allocates CPU time slices to processes, begins keeping a list of processes that execute. As the memory is being copied, a monitor process traverses the list of processes that have executed since the beginning of the copy. For each process with dirty bits set in its page table entries, i.e. modified pages, the monitor process then copies those pages to the second computer system (via the communications port and intersystem communication means). The monitor process also copies any non-process memory, such as kernel address space memory, that has dirty bits set in that memory's page table entries. Additionally, in multiprocessor systems, portions of memory allocated to individual CPUs are also queued for copying. The modified pages are then copied into the second computer system's memory at a location corresponding to the location used in the first computer system.

With each iteration of the process, the number of modified pages that the monitor process needs to copy from the first computer system to the second computer system generally diminishes. Eventually, only a predefined threshold, e.g., a trivial amount, of modified pages remain. Once the threshold is reached, all process execution, except that of the monitor process, may be halted, the small number of modified pages may be copied over, and process execution may be resumed. The two computer systems are then operating in lockstep. If the threshold of modified pages is sufficiently small, then the system experiences virtually no interruption or downtime. To further understand the invention, the following diagrams depicting at least one embodiment are illustrative.

Figure 1B:
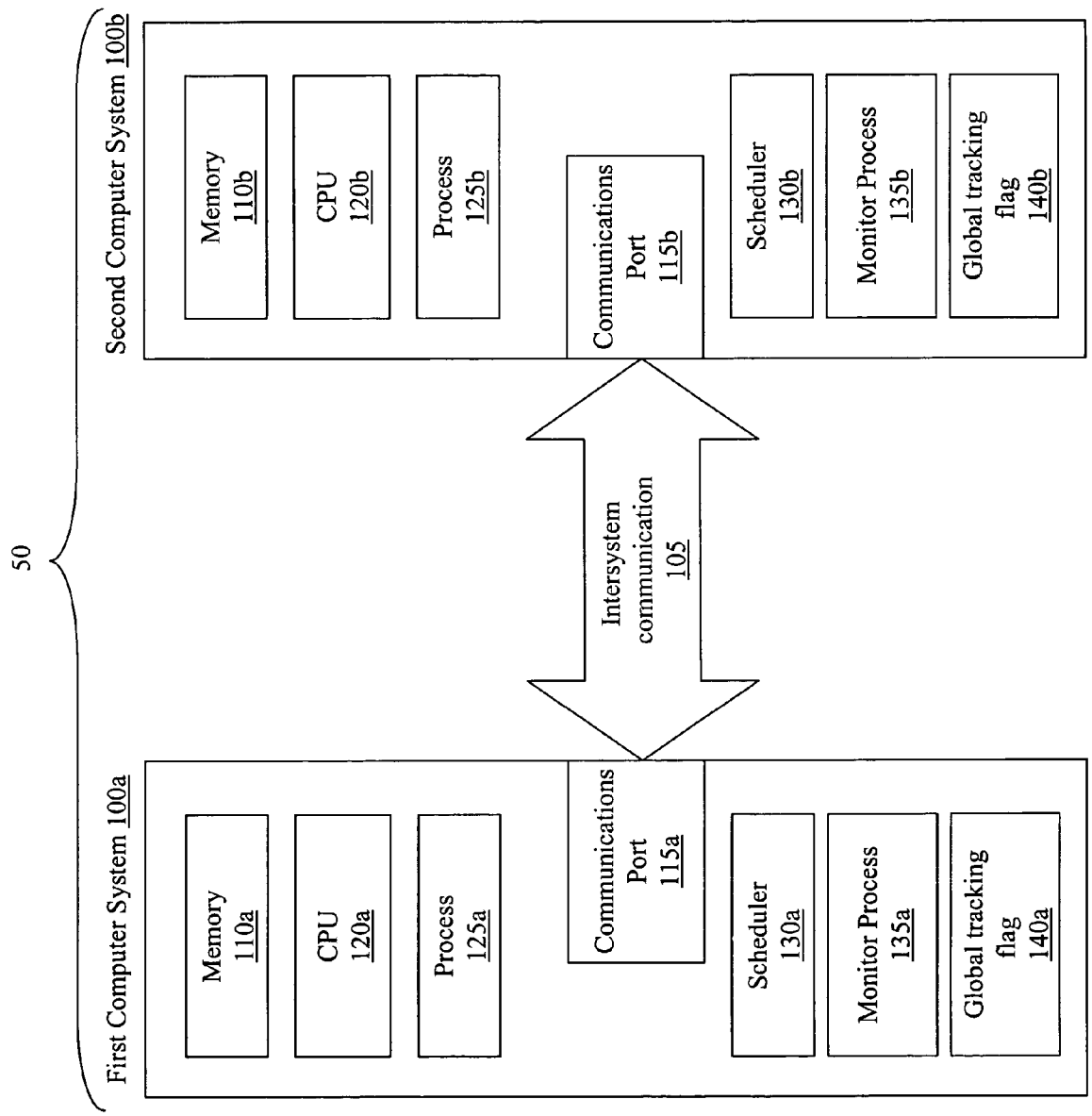

FIGS. 1A and 1B are block diagrams depicting an embodiment of a fault-tolerant system before and after achieving lockstep, respectively. FIG. 1A illustrates the systems before achieving lockstep. The fault-tolerant system 50 includes a first computer system 100a and a second computer system 100b (generally 100) and a means for intersystem communication 105. The computer systems 100 also each have a memory 110a, 110b (generally 110), and a communications port 115a, 115b (generally 115) in signal communication with the intersystem communication means 105. This means for intersystem communication may be one or more of several communications technologies. In some embodiments, the first computer system 100a and the second computer system 100b communicate using a direct memory access (DMA) engine, the engine allowing the first computer system 100a to write directly to the memory of the second computer system 100b. In a version of that embodiment, both computer systems 100 are connected to a common backplane, the backplane also connecting the two computer systems 100 to one or more I/O devices (not shown). In other embodiments, the two computer systems 100 communicate via an Ethernet, a Gigabit Ethernet, or a Fibre Channel connection. In some embodiments, the communication is over a PCI bus, a PCI-X bus, a PCI-Express bus, a PCI DDR bus, a SCSI bus, or an iSCSI bus. In some embodiments, the communication occurs over an RDMA connection, a T1 line, an ISDN line, a cable-modem connection, and a DSL connection. Additionally, communications may occur over any combination of the above.

The computer systems 100 also generally have one or more Central Processing Units (CPUs) 120a, 120b (generally 120). Before lockstep, the CPU 120a of the first computer system 100a also executes one or more processes 125a. The first computer system 100a also includes a scheduler 130a which determines the order in which processes 125a execute on the CPU 120a. The first computer system 100a also includes a monitor process 135a which is configured to manage the brownout cycle. The first computer system 100a also includes a global tracking flag 140a for determining how long memory and modified pages from the first computer system 100a should be tracked and copied to the second computer system 100b to reduce the differences between the respective memories 110 of the two computer systems sufficiently enough to achieve lockstep.

After lockstep is achieved, as illustrated in FIG. 1B, both computer systems 100 are operate generally identically. A process 125a executing on the first computer system 100a has a corresponding process 125b executing on the second computer system 100b, the processes (generally 125) executing generally the same instruction at generally the same time. In particular, both computer systems 100 each have a respective scheduler 130a, 130b (generally 130), a respective monitor process 135a, 135b (generally 135), and a respective global tracking flag 140a, 140b (generally 140). Once the system 50 achieves lockstep, the system 50 becomes fault-tolerant because the first computer system 100a may now fail and the second computer system 100b can then operate as the online system (e.g., while the first computer system 100a is being replaced or repaired).

Figure 2:
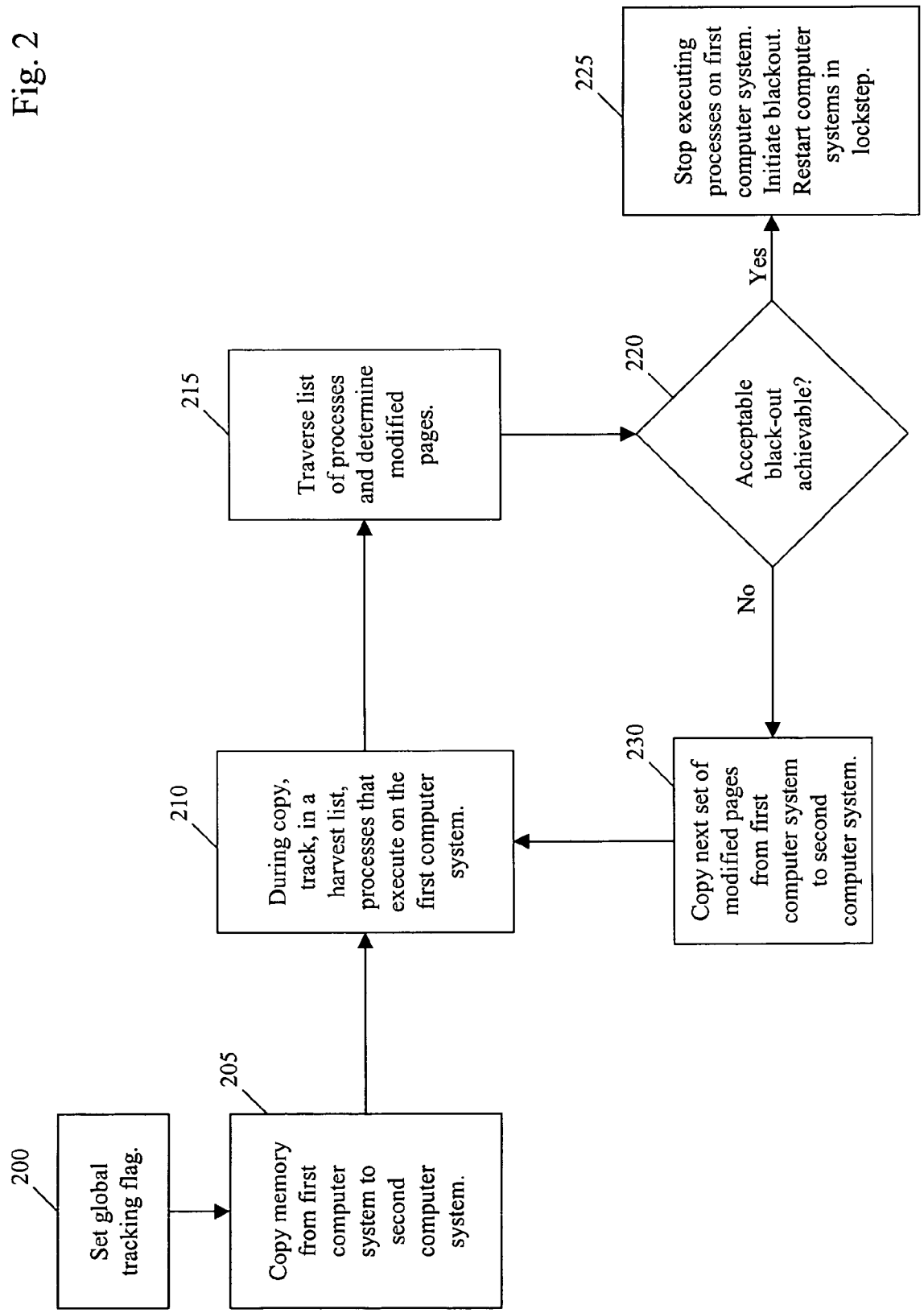
FIG. 2 is a flowchart depicting an embodiment of a method for tracking modified pages during a brownout period.

FIG. 2 is a flowchart depicting an embodiment of a method for tracking modified pages during a brownout period. To initiate the general track-and-copy procedure, the monitor process 135a of the first computer system 100a sets a global tracking flag 140a within the operating system of the first computer system 100a (step 200). The first computer system 100a then begins copying the memory 110a from the first computer system 100a to the second computer system 100b (step 205) via each computer system's respective communications ports 115 and the intersystem communication means 105. As part of the scheduler's execution, the scheduler 130a determines if the global tracking flag 140a is set (during a brownout period, this is always true and thus omitted from FIG. 2). If the scheduler 130a determines that the global tracking flag 140a is set, the scheduler 130a then tracks (step 210), described below in reference to FIG. 4, a "harvest list" of the processes 125a that execute between the start of the memory 110a copy and a later point in time. References herein made to the harvest lists are understood to include harvest lists and stopped process lists as described below in reference to FIG. 4. "Harvest list," as a general term, encompasses any list of processes that have executed between the first point in time and a later point in time. Though a harvest list proper is a new data structure utilized by the present invention, the stopped process list may already exist in an operating system implementing the present invention.

A stopped process list generally assists in process destruction after the process's execution has completed. Because a process cannot free its own memory space, a kernel process assists in the destruction of processes i.e., a process, once its memory is freed, cannot check itself to determine if its memory is freed. To identify which processes are to be destroyed, some operating systems store stopped processes in a stopped process list so that the kernel process that frees terminated processes' memory may easily determine which processes to terminate. The present invention, in some embodiments, uses a modified stopped process list to prevent the kernel process from destroying a process until the process's memory is traversed for modified pages. In this modified stopped process list, the process's "not harvested" bit is set to true when the process ceases execution. The "not harvested" bit remains true, and thus the process is not destroyed, until the monitor process traverses the process's memory and sets the not harvested bit to false. The kernel process that frees process memory, determining that the process's not harvested bit is false, then frees the memory of the process, thereby destroying the process.

After process tracking is initiated, at a later point in time, the monitor process 135a traverses the harvest list, determining which pages in memory 110a have been modified (step 215). The monitor process 135a determines if the number of modified pages to be copied from the first computer system 100a to the second computer system 100b falls below a threshold value that represents an acceptable time for the system to be down, i.e., a black-out period where lockstep can be achieved in an acceptable time, e.g., two hundred to three hundred milliseconds (step 220). If the number of pages is below the threshold, both computer systems 100 are halted, the modified pages are copied from the first computer system 100a to the second computer system 100b, and both computer systems 100 are restarted, operating in lockstep (step 225). If the number of pages is not below the threshold, then those modified pages are copied to the second computer system 100b via the intersystem communication means 105 (step 230). The brownout interval then continues: the scheduler 130a now tracks the processes 125a that executed during the copy of the modified pages (step 210). As before, the monitor process 135a retrieves the modified pages of the processes 125a that executed since the beginning of the last copy (step 215). Before the pages are copied to the second computer system 100b, the blackout threshold is checked (step 220), and if not met, the cycle repeats.

Figure 3:
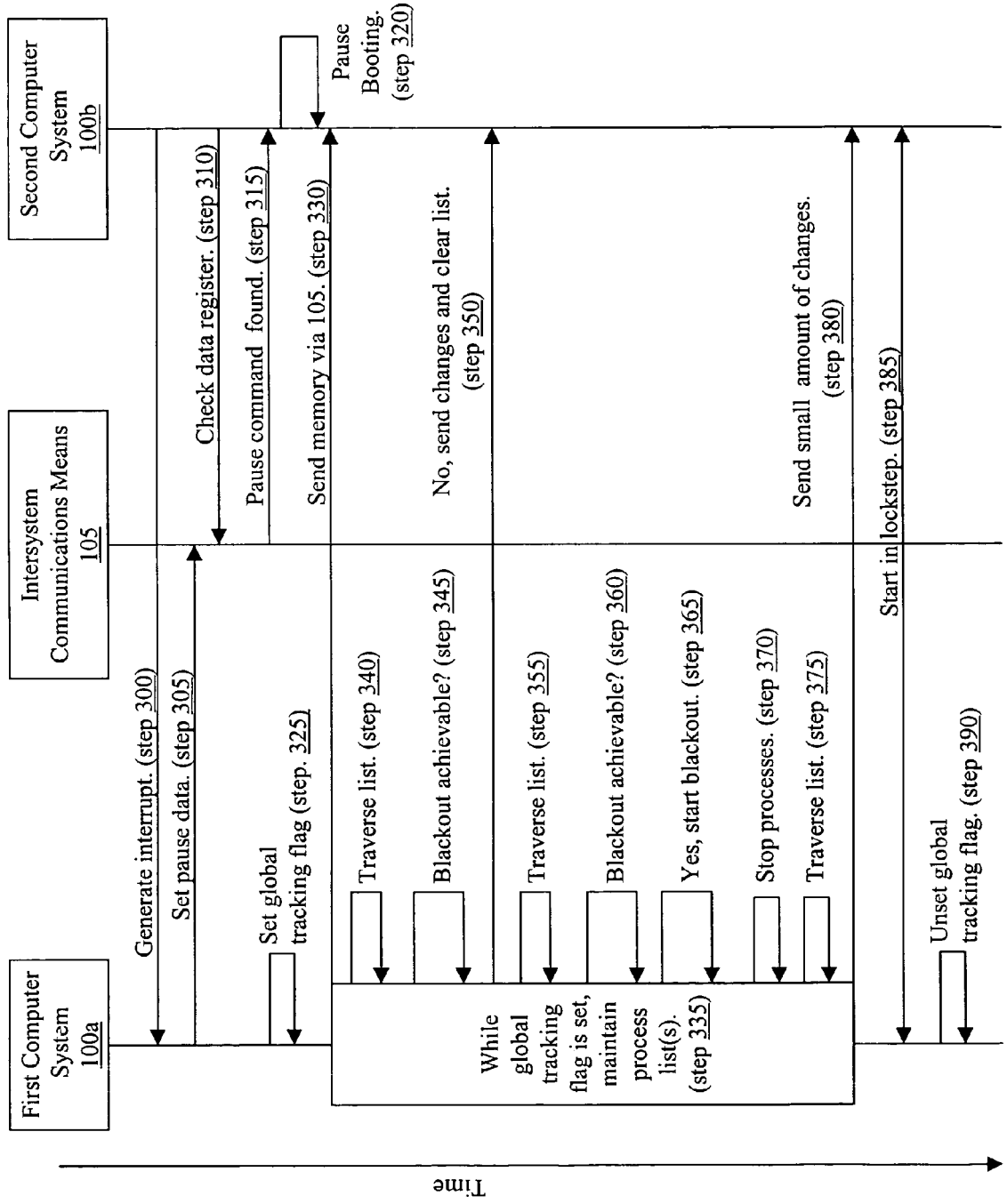
FIG. 3 is a sequence diagram depicting an embodiment of communications exchanged between the first and second computer systems via the intersystem communication means.

FIG. 3 is a sequence diagram depicting an embodiment of communications exchanged between the first and second computer systems 100 via the intersystem communication means 105. Whereas FIG. 2 depicts a high level view of the brownout cycle, FIG. 3 depicts a more detailed embodiment. In this embodiment, the two computer systems 100 are each connected to a backplane, the backplane also connected to one or more I/O boards (the backplane and I/O board(s) referred to as a whole as the intersystem communications means 105). As the second computer system 100b is plugged into the intersystem communication means 105, an interrupt is sent (step 300) to the monitor process 135a of the first computer system 100a. The monitor process 135a then sets data (step 305) in a register located on an I/O board in the intersystem communication means 105. The data set in the register is an instruction that the second computer system 100b should pause the second computer systems' boot process. As the second computer system 100b boots, the second computer system 100b checks (step 310) the data register on the I/O board via the intersystem communication means 105. In some embodiments, upon reading the data in the register indicating that the second computer system 100b should pause the boot process, the second computer system 100b then performs a diagnostic on itself, verifying that the components of the second computer system 100b are in working order. If the diagnostic completes successfully, the second computer system 100b moves to the next step.

The second computer system 100b then pauses the boot process (step 320) and begins listening for any memory or modified pages that the first computer system 100a sends to the second computer system's communications port 115b. When memory or modified pages are sent to the communications port 115b, the second computer system 100b copies the memory or modified pages into the appropriate location in memory 100b. In some embodiments, such as those where the intersystem communication means 105 includes a DMA engine, the second computer system 100b generally does no processing of the received memory and modified pages, the first computer system 100a instead writing directly to the memory 110b of the second computer system 100b.

The brownout period begins by the monitor process 135a setting (step 325) the global tracking flag 140a. Once the global tracking flag 140a is set, the first computer system 100a copies the memory 110a from the first computer system 100a to the second computer system 100b via the communications ports 115 and the intersystem communication means 105 (step 330). During the memory copy, which, depending on the size of the memory may be microseconds, seconds, or even minutes, the first computer system 100a continues to execute normally, e.g., executing processes 125a and handling requests (e.g., user requests and/or I/O requests). In one embodiment, however, before the scheduler 130a assigns CPU execution cycles, or time slices, to the processes 125a on the first computer system 100a, the scheduler 130a determines if the global tracking flag 140a is set. When the global tracking flag 140a is set, the processes 125a that execute are maintained in a harvest list by the scheduler 130a (step 335). At a second point in time, the monitor process 135a traverses the harvest list and retrieves the modified pages in the memory 110a from the processes 125a in the harvest list (as described below in reference to FIG. 4) (step 340).

In some embodiments, the time difference between the first point in time and the second point in time is a defined time interval, such as 100 milliseconds or 10 seconds. In those embodiments, generally every 100 milliseconds or 10 seconds, respectively, the first computer system 100a begins a new tracking interval, sending the changes that occurred to the memory 110a during the previous particular interval to the communications port 115a for copying to the second computer system 100b.

In some embodiments, this time interval is the time necessary to copy the particular memory, be it the entire memory or the modified pages, from the first computer system 100a to the second computer system 100b. For example, the first computer system 100a copies its entire memory 110a on the first pass. In one embodiment, the difference between that first point in time, i.e., the copying of the first byte of the memory 110a, and the second point in time, i.e., the copying of the last byte of the memory 110a, is large compared to the amount of memory, i.e., modified pages, copied in a second pass. In the second pass, the first computer system 100a copies just the dirty memory of only the processes 125a that ran since the beginning of the memory copy in the first pass, i.e., only the modified pages. Consequently, the time taken to copy the memory in the second pass is a smaller time interval compared to the first pass. The time interval of a third pass, if necessary, however, is shorter still, since just the dirty memory of only the processes 125a that executed during the second pass is traversed and copied. Thus, the time interval converges towards a negligible amount as less and less memory needs to be copied.

In some embodiments, the difference between the first point in time and the second point in time is a function of the size of the memory 110a. For example, the time interval may be fixed at a small interval for small memories, e.g., a 1-millisecond interval for a 1 megabyte memory, or a large interval for large memories, e.g., a 10-second interval for a 1 gigabyte memory. An inverse function may also be applied whereby small intervals are used for large memories while large intervals are used for small memories. Those skilled in the art will apply interval-to-size functions as is applicable to their circumstances. For example, smaller intervals may be applicable for an unreliable connection between computer systems which can tolerate smaller amounts of data loss in the event of a connection problem while larger intervals may be appropriate for reliable, high-bandwidth connections.

In some embodiments, the difference between the first point in time and the second point in time may be a function of the throughput of the communications port 115*a*. If the throughput of the communications port 115*a* is small, e.g., 100 bytes per cycle, then the time interval may be large since the throughput of communications port 115*a* may only be able to send a limited number of modified pages per data copy cycle to the second computer system 100*b*. Conversely, if the throughput of the communications port 115*a* is large, a small time interval is usable because a large amount of modified pages are sendable per copy cycle.

In at least one embodiment, the difference between the first point in time and the second point in time is an estimated time necessary to complete the copy of the memory 110*a* or the modified pages of the first computer system 100*a* to the second computer system 100*b*. In these embodiments, the interval is determined by predicting the amount of time necessary to copy the modified pages. Unlike the embodiment described previously where the second point in time was the completion of the copy, this embodiment does not require the copying of the modified pages to the memory 110*b* of the second computer system 100*b* to complete. In this embodiment, the second time interval is chosen based on an estimate function. This estimate, and thus the interval, may then be adjusted in subsequent copies based on past copying performance metrics such as data throughput.

In at least one embodiment, the difference between the first point in time and the second point in time is determined by how long the scheduler 130*a* or the monitor process 135*a* have a lock on the harvest list. Because the harvest list is a shared resource, the operating system protects the harvest list as the operating system does with any file or resource, i.e., locking the harvest list during read or write operations. For example, while the monitor process 135*a* traverses the harvest list, in one embodiment, the monitor process 135*a* locks the harvest list, preventing the harvest list from being modified. Because the harvest list is locked, the scheduler 130*a* cannot write the processes the scheduler 130*a* is tracking to the harvest list. The scheduler 130*a* therefore queues up an internal list of the processes 125*a* that execute while the monitor process 135*a* has a lock on the harvest list. Once the monitor process 135*a* releases the harvest list, the scheduler 130*a* may add process entries to the harvest list for the processes 125*a* that executed since the last copy operation. Conversely, while the scheduler 130*a* is writing process entries to the harvest list, the monitor process 135*a* may not generally read from the harvest list. In this embodiment, the time difference between the first point in time and the second point in time therefore is the time necessary for the scheduler 130*a* to obtain a lock on the harvest list, write the entries for the processes that have executed, and release the lock; the interval ending when the monitor process 135*a* obtains a lock and traverses the harvest list.

In some embodiments, as the harvest list of processes 125*a* is traversed, process entries are removed from the harvest list after having their page table entries examined. Removing entries ensures that the harvest list generally decreases in length over time.

Referring still to FIG. 3, after the first list traversal (step 340), the first computer system 100*a* then determines if an acceptable blackout is achievable (step 345). In this example, acceptable blackout is not achievable, so the brownout continues. The modified pages are then sent (step 350) to the second computer system 100*b* via the intersystem communications means 105. The modified pages are then copied to the portions of memory those pages represent on the second computer system 100*b*. For example, if a memory page resided at address 0x1234000 in the first computer system's memory 110*a*, then the first computer system 100*a* copies the page into address 0x1234000 in the second computer system's memory 110*b*. Again, in some embodiments, the first computer system 100*a* is copying the memory directly into the corresponding address in the second computer system's memory 110*b* using a DMA engine as an intersystem communication means 105. In other embodiments, the second computer system 100*b*, upon receiving the modified pages, copies the received pages into the memory 110*b* of the second computer system 10*b*. Additionally, in some embodiments, the process entries in the harvest list are cleared after each is traversed and the modified pages are sent to the communications port 115*a* to be copied to the second computer system 100*b*. The cycle of track-and-copy is then repeated.

As the modified pages are sent to the second computer system 100*b*, the scheduler 130*a* keeps tracking (step 335) the processes 125*a* that executed since the last modified pages were sent to the second computer system 100*b*. The monitor process 135*a* traverses the harvest list (step 355) and the monitor process 135*a* determines which pages have been modified. The monitor process 135*a* then determines (step 360) if an acceptable blackout period is achievable.

An acceptable blackout period, when sufficiently small, allows both computer systems 100 to safely halt the execution of processes 125*a*, have the small number of modified pages copied from the first computer system 100*a* to the second computer system 10*b*, and then have the two systems 100 begin executing processes 125 in lockstep synchronicity. In some embodiments, the number of modified pages that need to be copied to the second computer system 100*b* determines an acceptable blackout period. In other embodiments, an acceptable blackout period is a maximum amount of time needed to stop all processes, copy the modified pages, and then restart the two computer systems 100. In embodiments where the difference threshold is time-based, two hundred to three hundred milliseconds is typically sufficiently small. In the example, an acceptable blackout period is achievable. The blackout period is then initiated (step 365).

During the blackout, the first computer system 100*a* stops executing processes 125*a* (step 370) except the monitor process 135*a*. Interrupts are paused and the monitor process 135*a* traverses the harvest list (step 375) again. The monitor process 135*a* sends (step 380) the small amount of modified pages to the second computer system 100*b* and the modified pages are applied to the memory 110*b* of the second computer system 100*b*. In some embodiments, the memory utilized by the operating system's kernel (not shown) is also copied from the first computer system 100*a* to the second computer system 10*b*. Additionally, in computer systems 100*a* where multiple CPUs 120*a* are present, memory may be allocated for each CPU 120*a*. In these embodiments, each CPU's allocated memory (not shown) is also copied from the first computer system 100*a* to the second computer system 100*b*. After all modified pages and memory to be copied are sent and applied to the second computer system 100*b*, the two computer systems 100 are restarted (step 385), operating in lockstep, and the global tracking flag 140*a* is unset (step 390).

Figure 4:
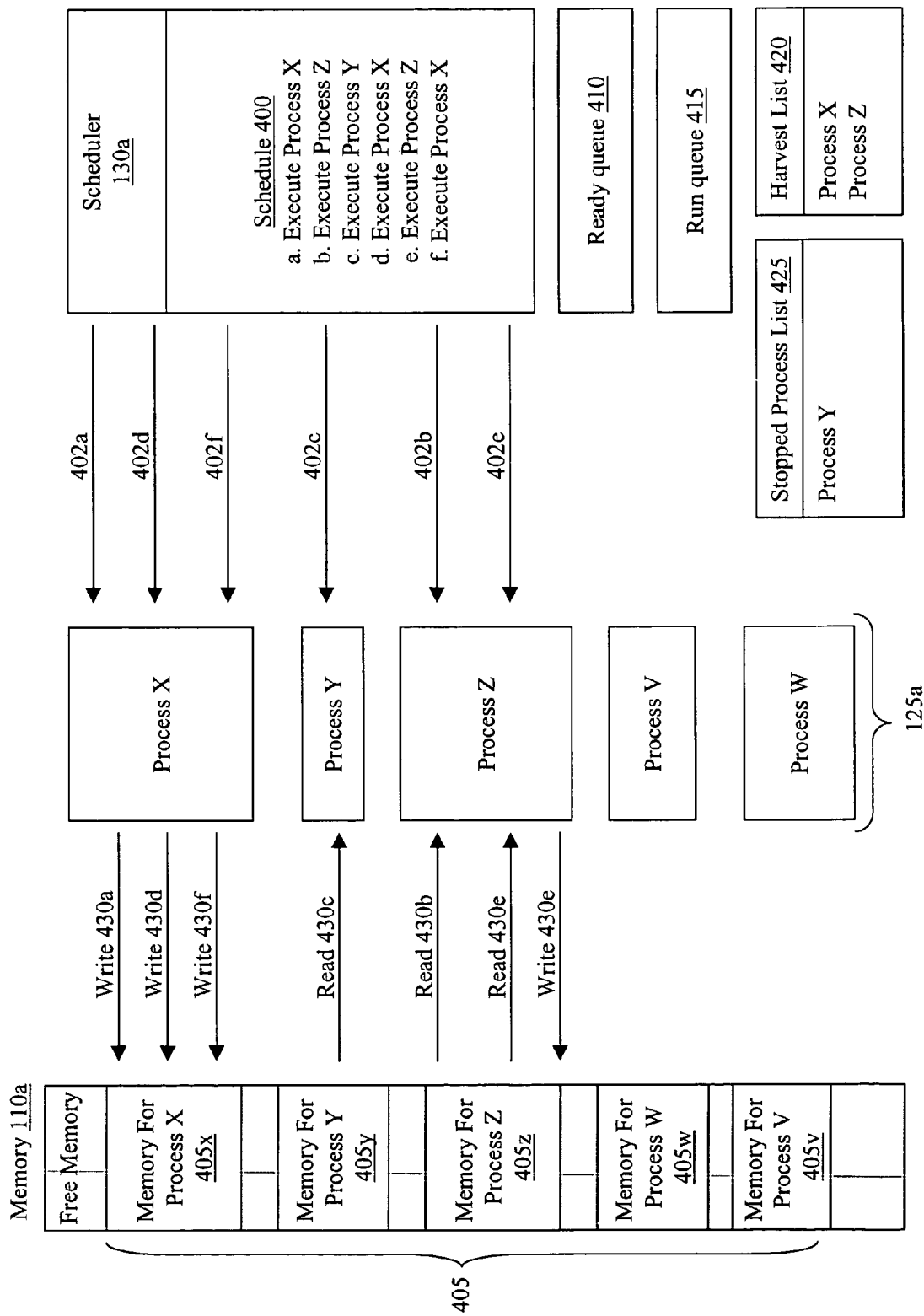
FIG. 4 is a block diagram illustrating an embodiment of the interactions between the scheduler, processes and the memory of the first computer system.

FIG. 4 is a block diagram illustrating an embodiment of the interactions between the scheduler 130*a*, processes 125*a* and the memory 110*a* of the first computer system 100*a*. Briefly, FIG. 4 depicts how entries get into the harvest list, how the list is traversed, and how modified pages are determined. As is depicted by a schedule 400, the scheduler 130*a* may allow processes 125*a*, such as process X, Y, Z, V, and W, to execute on the CPU 120*a* (steps 402*a* through 402*f,* generally 402). The schedule 400 is merely illustrative of an order of process execution and is not to be construed as limiting the scheduler 130*a* to any particular, predefined, or predictive scheduling algorithm.

As each process 125*a* executes, the process 125*a* may access a respective portion 405*x*, 405*y*, 405*z*, 405*v*, 405*w* (generally 405) of the memory 110*a* of the first computer system 100*a* assigned to it. This access may include read commands, where the contents of the memory 405 being accessed are retrieved, write commands, where data is stored in the memory 405, or a combination of both. It should be noted that the processes 125*a* do not interact with the physical memory, but instead interact with the operating system's memory management subsystem's representation of physical memory. As discussed above, each process's view of its allocated memory is represented by the process's hardware page table. References made to reading from or changing the system memory 110*a* are understood to be references to accessing the process's respective hardware page table entries. Again, a hardware page table entry being modified is reflected by each modified entry's dirty bit being set.

During the normal operation of the computer systems 100, the scheduler 130*a* accesses the operating system's ready queue 410 and run queue 415. The scheduler 130*a* uses the ready queue 410 and the run queue 415 to algorithmically schedule CPU time slice allocation. Briefly, processes 125*a* that are not waiting for input/output (I/O) operations, such as user input via a keyboard or mouse, are placed in the ready queue 410. These processes 125*a* are then given a time slice, or quantum, during which they may utilize CPU execution cycles. A process 125*a* that is executing is placed in the run queue 415. Once the process's execution ends, either because the process 125*a* has completed execution or because the process's allocated time slice has expired, the process 125*a* is removed from the run queue 415. If the process 125*a* has not completed its processing task, the process 125*a* is placed back in the ready queue 410. The invention improves on the first computer system's normal operation by tracking, via the scheduler 130*a*, which processes 125*a* have executed or are currently executing.

The scheduler 130*a* tracks executed processes by keeping a harvest list 420 of the processes 125*a* that enter or exit the run queue 415. The harvest list 420 is a global variable in the operating system and is thus accessible by all components of the first computer system 100*a* mentioned herein. In one embodiment, as each process 125*a* is switched out of the run queue 415, the process 125*a* is added to either the harvest list 420 or to a stopped process list 425. If the process 125*a* requires further execution time slices, then the process is added to the harvest list 420 before being put back in the ready queue 410. If the process 125*a* completed execution, the process 125*a* is placed in the stopped process list 425. The stopped process list 425 is a list of processes 125*a* that have completed execution and thus should not be placed back into the ready queue 410 because they do not require further execution time slices. The monitor process 135*a* uses both the harvest list 420 and the stopped process list 425 to reduce the amount of memory that is copied during the next iteration of the brownout period. The harvest list 420 of executed processes 125*a* and the stopped process list 425 may both be stored in any number of data forms, such as linked lists or arrays.

In some embodiments, the list paradigm is implemented similar to a hashtable, where each key, in this case a process 125*a* or process ID, in the list is unique. In this embodiment, before adding a process entry to the harvest list 420, the scheduler 130*a* determines if the process 125*a* or process ID of that process 125*a* is already in the harvest list 420. If the process 125*a* or process ID is already in the harvest list 420, then the scheduler 130*a* does not add an entry for the process 125*a*. When a process 125*a* or process ID is not in the harvest list 420, the scheduler 130*a* adds the process 125*a* or process ID to the harvest list 420. When a single instance of process representation is not enforced, i.e., having multiple entries in the harvest list 420 for a particular process 125*a* that executed multiple times, the process's allocated memory 405 is traversed an additional time during the copying cycle for each instance that the process 125*a* executed. Therefore, it is advantageous, in some embodiments, to represent a particular process 125*a* or process ID once in the harvest list 420.

For example, an offline computer system is going to be brought online and into lockstep with an existing, online computer system. The monitor process 135*a* sets the global tracking flag 140*a* to true, indicating that the scheduler 130*a* should start tracking processes 125*a*. The system memory 110*a* is copied to the second computer system 100*b*. During this copy, as part of the scheduler's operation, the scheduler 130*a* checks the global tracking flag 140*a*. Because the global tracking flag 140*a* is now set to true, the scheduler 130*a* begins adding entries to the harvest list 420 for any process 125*a* that the scheduler 130*a* allocates CPU time slices to. The scheduler 130*a* then reads from the ready queue 410 and allocates a time slice of CPU execution cycles to the next process 125*a*. Still referring to FIG. 4, in this scenario, Process X is allocated (step 402*a*) a time slice of the CPU. Process X is put in the run queue 415 during its execution. During execution, Process X writes (step 430*a*) to a portion 405*x* of the system memory 110*a* allocated to it (again, via the hardware page table). Process X's allocated execution time elapses, a timer interrupt is sent to the process (per standard operating system operation), and the scheduler 130*a* removes Process X from the run queue 415. Because Process X is not finished executing, the scheduler 130*a* places Process X back in the ready queue 410 for allocation of a future CPU execution time slice. Additionally, because Process X executed during a brownout period, the scheduler 130*a* attempts to add an entry to the harvest list 420 for Process X. The scheduler 130*a* checks the harvest list 420 to determine if Process X is in the harvest list 420. Not finding Process X, the scheduler 130*a* adds an entry to the harvest list 420 for Process X. It should be noted that adding a process 125*a* to the harvest list 420 may be done before a process 125*a* is placed in the run queue 415, after the process 125*a* is placed in the run queue 415, or as the process 125*a* is exiting the run queue 415.

After Process X is placed back in the ready queue 410, Process Z is allocated (step 402*b*) a time slice of the CPU. Process Z in turn reads (step 430*b*) from the portion 405*z* of the system memory 110*a* allocated to it. Process Z's time also expires before the process finishes processing and Process Z is placed back in the ready queue 410. Because Process Z executed during the brownout, the Process Z is also recorded in the harvest list 420 (including the determination that Process Z is not already in the harvest list 420). Process Y is then allocated a CPU time slice, placed in the run queue 415, and during execution reads from its memory 405*y* (steps 402*c* and 430*c*). Process Y, however, completes execution and is therefore not put back in the ready queue 410. Because the global tracking flag 140*a* is set though, Process Y is recorded in the stopped process list 425 because Process Y executed during the brownout interval. The cycle of execution repeats as indicated in FIG. 4 by CPU time slice allocation steps 402*d* through 402*f* and memory access steps 430*d* through 430*f* until this brownout interval finishes. During this brownout, note that Processes V and W were not selected for execution. As a result, neither was placed in the ready queue 410 and thus neither went into the run queue 415. Correspondingly, neither was recorded in the harvest list 420 or the stopped process list 425 as being executed, nor were their respective memories 405v, 405w modified.

Once the brownout interval is reached, the monitor process 135a iterates through the harvest list 420 and the stopped process list 425 and the processes 125a that executed during the brownout period are then polled to determine which entries in the hardware page table/allocated memory 405 have their respective dirty bits set. In some embodiments, disparate processes may have modified the same portion of memory, i.e., memory shared between processes 125a. All entries with a dirty bit set are then mapped to a bitmap (not shown), the coordinates of the bitmap corresponding to regions of the first computer system's memory 110a. Each section of the bitmap represents a portion of the first computer system's memory 110a such that a particular coordinate represents a particular block of first computer system's memory 110a. For example, the fifth "bit" in the bitmap may correspond to the fifth frame of physical memory. Representing the memory 110a this way allows the monitor process 135a to copy data from only specific addresses of the memory 110a of the first computer system 100a to the second computer system 100b as well as copy memory modified by multiple processes, i.e., shared memory, only once. For example, if Process X and Process Z shared a portion of memory and both processes modified that particular portion during their respective executions, then the coordinate on the bitmap representing that portion of memory 110a would be marked as modified. Though the bitmap would be marked first as during the execution of Process X, no indication is generally given as to which process changed the memory. In one embodiment, that portion of the bitmap is re-marked when the monitor process 135a determines that Process Z also modified that portion of memory. In a preferred embodiment, however, since that coordinate on the bitmap is already marked as being modified, it is not marked again unless a brownout interval separates the processing of Process X's memory and Process Z's memory. Thus, that portion of memory is copied over only once, even if the memory portion was modified multiple times within one brownout interval.

In the embodiment depicted in FIG. 4, as mentioned, Processes V and W did not execute. Therefore the page table entries representing their portions 405v, 405w of memory 110a do not need to be checked for modified pages. In a system where dozens, hundreds, or even thousands of processes 125a may potentially exist, the present invention reduces the overhead of searching for differences in the memory between the last copy cycle and the current time because not all memory 110a is searched, only the memory of processes 125a that executed, i.e., 405x, 405y, 405z. By reducing overhead, the amount of memory that needs to be copied in each copy cycle is therefore reduced since there is a smaller interval for changes to possibly occur within.

Even though three processes 125a ran during the brownout period (Processes X, Y, and Z), it is determined, after the monitor process 135a iterates through the harvest list 420 and stopped process list 425, and checks the dirty bits of each process's page table entries, that only Processes X and Z made modifications to their respective memory pages 405x, 405z. Because Process Y only performed a read operation (step 430c), no section of its portion 405y of the system memory 110a has its dirty bit set, and thus no section of its memory 405y needs to be copied to the second computer system 100b. This too reduces the amount of the modified memory that must be copied during a brownout. As each entry is traversed and their memory 405 is marked in the bitmap to be copied, the entry's dirty bit is reset, preventing that portion of memory from being copied in a subsequent pass unless the page is modified again.

As the cycle repeats, the amount of modified memory that needs to be copied to the second computer system 100b generally converges toward a predetermined difference threshold that represents an acceptable blackout period. Once the threshold is reached, the blackout procedures as described above can be initiated.

From the foregoing, it will be appreciated that the systems and methods provided by the invention afford a simple and effective way to track modified pages on a computer system.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for tracking modified pages in a system comprising a first computer system having a monitor process and a second computer system, the method comprising the steps of:
    copying, at a first point in time, a memory from the first computer system to the second computer system using the monitor process;
    tracking, after the first point in time until a second point in time, a process that executes on the first computer system between the first point in time and the second point in time;
    determining, from the process, after the second point in time, if a page of the memory was modified by the process;
    copying the page, if modified, from the first computer system to the second computer system using the monitor process;
    determining if a number of modified pages to be copied from the first computer system to the second computer system can be performed during an acceptable blackout period using the monitor process;
    halting all processes on the first computer system except the monitor process during the blackout period;
    copying the number of modified pages from the first computer system to the second computer system using the monitor process; and
    restarting the first computer system and the second computer system such that the first computer system and the second computer system are in lock step operation.

2. The method of claim 1 wherein wherein the blackout period is from between about two hundred and about three hundred milliseconds.

3. The method of claim 1 wherein the difference between the first point in time and the second point in time is the time necessary for a resource lock to be obtained, the processes to be retrieved, and the changes the process made to memory determined.

4. The method of claim 1 wherein the difference between the first point in time and the second point in time is a defined time interval.

5. The method of claim 1 wherein the difference between the first point in time and the second point in time is a function of the size of the memory.

6. The method of claim 5 wherein the difference between the first point in time and the second point in time is the time to complete the copying of the memory from the first computer system to the second computer system.

7. The method of claim 1 wherein the difference between the first point in time and the second point in time is a function of the throughput of a communications port.

8. The method of claim 5 wherein the difference between the first point in time and the second point in time is an estimated time necessary to complete the copy of the memory from the first computer system to the second computer system.

9. An apparatus for tracking modified pages, the apparatus comprising:
  a first computer system having a first memory and a processor;
  a second computer system having a second memory;
  the processor executing:
    a scheduler configured to:
      begin tracking processes executing on the processor;
      allocate an execution time slice of the processor to a process; and
      store an identity of the process in a process list in the first memory upon the process executing during the allocated execution time slice; and
    a first monitor process copying the first memory to a second memory during a first time period;
    wherein the first monitor process traverses the process list to determine which processes may have modified pages during the first period of time, and copies any pages modified during the first period of time to the second memory and wherein the first monitor process determines if a number of modified pages to be copied from the first computer system to the second computer system can be performed during an acceptable blackout period; and
    the processor configured to:
      halt all processes on the first computer system except the first monitor process during the acceptable blackout period;
      copy the number of modified pages from the first memory to the second memory using the first monitor process; and
      restart the first computer system and the second computer system such that the first computer system and the second computer system are in lock step operation.

10. The apparatus of claim 9 further comprising the scheduler configured to cease tracking executing processes.

11. The apparatus of claim 9 wherein the scheduler is at least one of a preemptive process scheduler, a non-preemptive process scheduler, and a task scheduler.

12. The apparatus of claim 9 wherein the identity of the process is a process ID.

13. The apparatus of claim 9 wherein the scheduler begins tracking executing processes in response to a global tracking flag being set.

14. The apparatus of claim 10 wherein the scheduler ceases tracking executing processes in response to a global tracking flag being unset.

15. The apparatus of claim 9 wherein the first memory where the process identity is stored is at least one of a harvest list and a stopped process list.

16. A system for tracking modified pages on a fault-tolerant system, the system comprising:
  a first and second computer system, each computer systems comprising:
    a memory;
    a communications port;
  the first computer system further comprising:
    a processor;
    a scheduler;
    a monitor process in communication with the scheduler and the memory and communications port, the monitor process configured to:
      copy, at a first point in time, the memory from the first computer system to the second computer system;
      retrieve, from a harvest list provided by the scheduler, a process that was executing on the processor between the first point in time and a second point in time;
      retrieve from the process, after the second point in time, a change to the memory made by the process;
      copy the change to the memory from the first computer system to the second computer system;
      determine if a number of modified pages to be copied from the first computer system to the second computer system can be performed during an acceptable blackout period using the monitor process;
      halt all processes on the first computer system except the monitor process during the blackout period; and
      copy the number of modified pages from the first computer system to the second computer system using the monitor process.

17. The system of claim 16 wherein the monitor process is further configured to restart the first computer system and the second computer system such that the first computer system and the second computer system are in lock step operation.

18. The system of claim 16 wherein the scheduler is at least one of a preemptive process scheduler, a non-preemptive process scheduler, and a task scheduler.

19. The system of claim 16 wherein the harvest list provided by the scheduler comprises processes that executed between the first point in time and the second point in time.

20. The system of claim 16 wherein the difference between the first point in time and the second point in time is the time necessary for a resource lock to be obtained, the processes to be retrieved, and to determine the changes the process made to memory.

21. The system of claim 16 wherein the difference between the first point in time and the second point in time is a defined time interval.

22. The system of claim 16 wherein the difference between the first point in time and the second point in time is a function of the size of the memory.

23. The system of claim 22 wherein the difference between the first point in time and the second point in time is the time to complete the copy of the memory from the first computer system to the second computer system.

24. The system of claim 16 wherein the difference between the first point in time and the second point in time is a function of the size of a throughput of the communications port, the communications port coupled to an intersystem communication means, the intersystem communication means being in signal communication with the first and the second computer system.

25. The system of claim 24 wherein the difference between the first point in time and the second point in time is an estimated time to complete the copy of memory from the first computer system to the second computer system.

26. The system of claim 16 wherein the harvest list is a stopped process list.

* * * * *